(12) United States Patent
Körner et al.

(10) Patent No.: US 7,787,132 B2
(45) Date of Patent: Aug. 31, 2010

(54) METHOD AND ARRANGEMENT FOR A RAPID AND ROBUST CHROMATIC CONFOCAL 3D MEASUREMENT TECHNIQUE

(75) Inventors: Klaus Körner, Schöneiche (DE); Christian Kohler, Schwaigern (DE); Evangelos Papastathopoulus, Jena (DE); Wolfgang Osten, Stuttgart (DE)

(73) Assignee: Sirona Dental Systems GmbH, Bensheim (DE)

( * ) Notice: Subject to any disclaimer, the term of this patent is extended or adjusted under 35 U.S.C. 154(b) by 0 days.

(21) Appl. No.: 12/223,079

(22) PCT Filed: Aug. 2, 2007

(86) PCT No.: PCT/EP2007/051212

§ 371 (c)(1),
(2), (4) Date: Sep. 11, 2008

(87) PCT Pub. No.: WO2007/090865

PCT Pub. Date: Aug. 16, 2007

(65) Prior Publication Data

US 2009/0021750 A1    Jan. 22, 2009

(30) Foreign Application Priority Data

Feb. 8, 2006  (DE) ................. 10 2006 007 170

(51) Int. Cl.
*G01B 11/24*  (2006.01)
(52) U.S. Cl. ..................................... 356/601; 356/622
(58) Field of Classification Search ......... 356/601–612, 356/614–624; 250/200, 201.1, 216
See application file for complete search history.

(56) References Cited

U.S. PATENT DOCUMENTS

| | | | | |
|---|---|---|---|---|
| 3,013,467 | A |   | 12/1961 | Minsky |
| 5,936,720 | A | * | 8/1999 | Neal et al. ................. 356/121 |
| 6,108,090 | A | * | 8/2000 | Ishihara ..................... 356/601 |
| 6,525,828 | B1 |   | 2/2003 | Grosskopf |

FOREIGN PATENT DOCUMENTS

| | | |
|---|---|---|
| DE | 10321885 | 12/2004 |
| DE | 10321895 | 12/2004 |
| GB | 2144537 | 3/1985 |

OTHER PUBLICATIONS

English Abstract of DE10321885.

(Continued)

*Primary Examiner*—Gregory J Toatley, Jr.
*Assistant Examiner*—Tri T Ton
(74) *Attorney, Agent, or Firm*—Dykema Gossett pLLC

(57) ABSTRACT

A chromatic confocal technique and apparatus for the rapid three-dimensional measurement of an object shape, particularly of a tooth in a patient's jaw, using an array of polychromatic point light sources, a planar detector matrix, a beam splitter for lateral spectral separation, and an objective for illuminating and recording the object. Spectral defined reference light bundles are generated, injected into the detection beam path via a reference beam path and, following spectral splitting, are focused on the detector matrix as reference image points, wherein laterally shifted sub-matrices are numerically defined on the detector matrix for spectral analysis of the object light, which sub-matrices are implemented as spectral cells for three-dimensional measurement of the shape of the object.

10 Claims, 3 Drawing Sheets

OTHER PUBLICATIONS

English Abstract of DE10321895.

H. J. Tiziani et al., "Three-Dimensional Image Sensing by Chromatic Confocal Microscopy" in Applied Optics, vol. 33, No. 10, Apr. 1, 1994, pp. 1838-1843.

A. K. Ruprecht et al., "Chromatic Confocal Detection . . . Measurements" in Proceedings of SPIE, vol. 5302-6, pp. 53-60 (2004).

Dissertation of J. Schmoll, "3D-Spektrofotometrie Extragalaktischer Emissionslinienobjekte," submitted to University of Potsdam, Jun. 2001.

* cited by examiner

METHOD AND ARRANGEMENT FOR A RAPID AND ROBUST CHROMATIC CONFOCAL 3D MEASUREMENT TECHNIQUE

BACKGROUND OF THE INVENTION

Confocal microscopy was proposed by Marvin Minski (cf. U.S. Pat. No. 3,013,467, Dec. 19, 1961).

The chromatic confocal technique provides the possibility of effecting focusing without the need for mechanically moving parts, which as a result usually reduces measuring time significantly, as was proposed by G. Molesini in 1983 in connection with a spectrometer (cf. GB 2144537 and DE 3428593 C2). An example of successful application of the chromatic confocal approach is described in a paper by H. J. Tiziani and H.-M. Uhde "Three-dimensional image sensing by chromatic confocal microscopy" in Applied Optics, Vol. 33, No. 1, April 1994, pages 1838 to 1843. In this case the spectral analysis is performed using three color filters. Thus, the achievable depth measurement and depth resolution are limited.

DE 103 21 885 A1 describes a chromatic confocal system including a component having variable refractive power, for example, a diffractive component. In the arrangement shown in FIG. 2 of this patent a row of micro-lenses is provided for illumination in order to obtain the confocal signals via the wavelength and, for analysis, a spectrometer containing a planar camera is disposed downstream, so that line profiles may be obtained from a single planar camera image by means of a line spectrometer.

In the publication "Chromatic confocal detection for high speed micro-topography measurements" by A. K. Ruprecht, K. Körner, T. F. Wiesendanger, H. J. Tiziani, W. Osten in Proceedings of SPIE, Vol. 5302-6, pp. 53 to 60, 2004, FIG. 4 shows a chromatic confocal line sensor for topographic measurement. Here, in order to obtain the confocal signals via the wavelength of the chromatic confocal system, a spectrometer is added to the arrangement such that line profiles of the surface of an object may be obtained from a single image using a single planar camera and a line spectrometer. The use of a spectrometer generally allows for better spectral resolution compared with a system incorporation three color filters or an RGB color camera or even a four channel camera, and therefore provides an advantage.

In the aforementioned citations, there is no mention of features concerning three-dimensional measurement of the shape of an object or the shape of a micro-object, meaning the capture of the entire shape of the object using a chromatic confocal technique and spectral analysis by a camera within the timeframe of creating a single image, i.e. the integration time for a camera frame, with which a higher spectral resolution would be obtainable than when using three or four color channels.

On pages 12 and 13 of the dissertation entitled "3D-Spectrophotometry of extragalactic emission lines" by J. Schmoll, submitted to the University of Potsdam in June 2001, lenticular direct coupling is described, which was first applied in the TIGER spectrograph by Courtes et al. in 1988. Here, the lenticular raster is rotated through an angle $\phi$ against the direction of dispersion. Because of the shift of adjacent spectra, this technique has the reputation of being complicated for evaluation and the area of the area sensor is not used economically as there is no high area filling factor.

In the scientific literature, terms such as 3D spectrophotography and imaging spectroscopy, and also integral field spectrophotometry are being used.

FIELD OF THE INVENTION

The present invention relates to three-dimensional measurement of the shape of an object, or the shape and position of one or more objects, using chromatic confocal techniques, which can be applied over a wide range of technological applications, for example, for fast determination of the 3D shape of small objects, in particular objects showing differences in altitude in mechanical engineering, in precision engineering and in micro-systems technology. Beyond that, biological specimens, including a number of micro-specimens, and shaped art objects and prehistoric objects of all sorts may be scanned three-dimensionally. Also, scanning of the cornea of an eye of a living organism may be performed quickly using the solution provided by the present invention.

The range of the lateral and depth resolution of the process may encompass several orders of magnitude.

Furthermore, the present invention may be applied to the three-dimensional measurement of the shape of an object, in particular, of one or more teeth in the jaw of a human being. In particular, the present invention may be considered as relating to three-dimensional measurement of shape in applications of all kinds in the dental field.

OBJECTIVES OF THE INVENTION

The objective of the present invention is to provide a universally applicable optical measuring method and measuring system with calibration for fast, three-dimensional measurement in commercial applications.

The technical objective of the present invention is to increase the robustness of fast three-dimensional optical measurement of the shape of objects or the shape and position of one or more objects of all kinds, including measurement on-a microscopic scale. Therefore, the objective is to generate geometrical information and not the generation of spectroscopic information.

SUMMARY OF THE INVENTION

It is an object of the present invention to measure, using chromatic confocal techniques simultaneously in various depths of the object space using spectral referencing to improve precision by calibration during planar optical scanning of one or more objects for fast three-dimensional measurement of the shape of the object or the shape and position of one or more objects, particularly to obtain within the time frame of creating a single image, i.e. the integration time of a camera frame. The objects being scanned may be of all kinds, in technical and non-technical fields. It is desired to obtain a significantly higher spectral resolution compared with that achievable with three or four color channels using multiple color filters or an RGB color camera or a four-channel color camera.

In particular, it is an object of the invention to measure comparatively quickly and robustly the three-dimensional shape of a tooth in the jaw of a human being using chromatic confocal technology with spectral referencing for precision improvement by calibration.

According to the invention a method and system for achieving a chromatic confocal technique for three-dimensional measurement of the shape of an object or the shape and position of one or more objects, including measurement on a microscopic scale, particularly also for a tooth or teeth in the jaw of a human being, utilizes the following components: a planar array of polychromatic point light sources, with at least one upstream polychromatic light source as well as at least one passive rastered component, the polychromatic point light sources being adapted to generate a multiplicity of light bundles, a beam splitter, at least one element having a refractive power that is wavelength-dependent for chromatic depth resolution, at least one planar, preferably pixeled, detector matrix in the path of the detection beam, upstream of which detector matrix means for lateral spectral splitting and means for focusing onto the detector matrix are disposed, and a measuring lens for illuminating and imaging the object. Here, "light" is used as a synonym for "electromagnetic irradiation" from the UV to IR range of the spectrum. Either the polychromatic point light sources are self-luminescent or the planar array of polychromatic point light sources is formed as a micro-aperture array or as a micro-lens array or as a micro-lens array with a downstream micro-aperture array, with at least one polychromatic light source upstream of the planar array.

According to the present invention at least partially spectrally defined, i.e. spectrally predetermined reference light bundles are at least intermittently provided for the method and the system for chromatic, i.e. spectral, calibration of the system, which light bundles spread across at least one passive rastered component of the array and propagate along a preferably achromatic reference beam path which is formed in the system by means of beam splitters. The reference light bundles are reflected into the reference beam path, and an inversion of the wave front is generated for the reference light bundles.

For generation of the reference light bundles preferably at least one additional, at least partially spectrally defined, i.e. spectrally predetermined, reference light source is added to the measuring light source, or the at least partially spectrally defined reference light is generated preferably also from the measuring light source or from the polychromatic point light sources, preferably by optical filtration.

It is preferred that a preferably at least approximately monochromatic, preferably electrically switchable, separate reference light source be added upstream of the micro-aperture array or the micro-lens array or the micro-lens array with a downstream micro-aperture array. This reference light source may be represented by a single laser diode.

Preferably, however, advantageously two, preferably at least approximately monochromatic, preferably electrically switchable, separate reference light sources are added upstream of the micro-aperture array or the micro-lens array or the micro-lens array with a downstream micro-aperture array, which reference light sources preferably illuminate the entire area of the array. The reference light sources for the chromatic calibration of the system are preferably turned off during the measuring operation. Thus, preferably only during chromatic calibration does the array illuminated by the reference light source or a rastered component of the array illuminated by reference light sources emit light, which is imaged via the reference beam path by reference light bundles, while the formation of an intermediate image of at least one rastered component of the array may preferably take place in the reference beam path. The reference light sources may be laser diodes.

Thus, according to the present invention, the positions of the measuring point light sources are always at least approximately laterally identical to those of the reference point light sources, as in this case, according to the present invention, the same components of the array are used, for example, the same micro-lenses or the same pinholes. Thus, only the light source is changed, or an optical filter is put in, or the spectral characteristics of the light source are modified. Thus, according to the present invention, it is possible that the planar array of point light sources may change the spectrum in a predetermined manner, so that, on the one hand, polychromatic light is generated for measurement purposes, while, on the other hand, spectrally limited light, preferably at least approximately monochromatic light is generated for calibration purpose, these operations preferably taking place at different time intervals.

But it is also possible that the polychromatic measuring light source exhibits preferably one or more characteristic, predetermined attributes in the spectrum, for example, local minima or maxima as well as steep edges, which may be used for calibration of the system instead of one or more separate reference light sources.

For analysis it is advantageous, however, to have a smooth measuring light spectrum, as this typically allows the analysis to be more precise, assuming no use is to be made of numerically elaborate procedures.

After passing through the reference beam path, the reference light bundles are coupled back into the beam path leading to the detector and then, after spectral splitting by a diffraction or dispersion element, i.e., a diffraction grating or dispersion prism, pass, preferably focused, to the preferably pixeled detector matrix, while preferably the pupil of the detector lens is traversed both by the reference light bundle and by the light bundle returning from object over approximately equal areas. By means of the detector matrix, the preferably sharp images of the point light sources generated by the reference light bundles, i.e. the reference point images, are also detected. According to the present invention, many laterally shifted sub-matrices are numerically defined on the detector matrix via the reference point image data for the purpose of spectral analysis of the object light, which shifted sub-matrices together form a sub-matrix array and are used for three-dimensional measurement. Each sub-matrix serves the purpose of generating depth information concerning exactly one point on the object. During measurement, spectral analysis of the object light is carried out in each sub-matrix by chromatic lateral splitting.

In doing so, reference point images are preferably used to determine the beginning and end of a sub-matrix for spectral analysis on the detector matrix using data obtained by the detector matrix. This is possible, for example, by numerical determination of the center of mass positions or the positions of maximum intensity of the reference point images as reference positions, i.e. as spectral reference points, on the detector matrix. These spectral reference points serve to effect chromatic calibration of the system. The connecting line between at least two spectral reference points then forms the spectral axis of each sub-matrix for spectral analysis on a numerical basis. Due to this reference data-supported determination using spectral reference points, the angular orientation of the spectral axis on the detector matrix is known with high precision. It is thus also possible to form an average of the angular orientations of the spectral axis determined in each sub-matrix—on the basis of the determined reference points—in a larger area of the detector matrix in each case, in order to be able to determine the position of the spectral axis in at least one area on the detector matrix even more precisely than when carrying out determination by means of a single sub-matrix. By reference data-based adjustment of the system—for example, by adjusting the means used for spectral splitting, e.g. a dispersion prism or a diffraction grating or even a detector matrix by rotation about the optical axis—the spectral axis may be oriented on the detector matrix exactly parallel to the rows and, if appropriate, to the columns of the detector matrix at least in the central area of the detector matrix. This greatly improves the precision of depth measurement, especially in the case of a not very highly pixeled detector matrix, as the outer margins of the preferably rectangular sub-matrices are always identical to the rows and columns of the detector matrix at least in the central area of the field, that is to say, the margins of the sub-matrices do not switch or intercept rows or columns, potentially leading to a reduction of the computation effort involved in data analysis.

It is possible, for example due to distortions of the focusing lens, that the angular orientation of the spectral axis on the detector matrix may vary slightly. In the outer areas of the field, the angular orientation of the spectral axis may indeed change upon severe distortions in such a way that the margins of the sub-matrices undesirably intercept rows or columns of the detector matrix. Knowledge of the angular orientation of the spectral axis, for example, in the outer area of the measured area may be deliberately used for numerical correction of the results, thus leading to an improvement in precision.

In addition, preferably the possibly somewhat location-dependent degree of the spectral splitting—that is, along the spectral axis—on the detector matrix, for example due to distortions in the focusing lens, is determined numerically for each sub-matrix from the position of at least two reference point images, from which spectral reference points are computed. Thus, it is possible to perform a sub-pixel interpolation along the spectral axis during spectral analysis, which is also technically sensible. Thus, during measurement, the resulting measuring wavelength at the maximum or at the mass gravity center of the confocal signal may be determined very precisely, even in the presence of distortions in the beam path and/or when the detector matrix is laterally out of adjustment or when, for example, temperature changes in the system or aging of the components cause slight light bundle shifts on the detector matrix.

By means of shaped reference objects or alternatively by means of reference objects at various depths of the measurable object space, it is possible using a depth calibration procedure—i.e. following completion of a measuring device based on this invention—to assign, extremely precisely, the depth position of object points to certain measuring wavelengths and to save then long-term in a calibration file.

In doing so, the positions of the spectral reference points on the detector matrix are also stored for each individual sub-matrix, which then represent the target positions of the spectral reference points. Chromatic calibration by means of spectral attributes of the measuring light source or by means of one or more reference light sources—that is, an internal calibration—is performed for the purpose of recognizing changes in the positions of the spectral reference points in relation to the target positions, when using a measuring device according to the present invention, by repeatedly determining the positions of the spectral reference points at time intervals chosen by the user of the system and comparing them with the target positions of the spectral reference points stored in the calibration file. This involves the use of a very precise spectral reference, for example, based on stabilized laser diodes, the precision of which is well above any imprecision due to imperfect instrument components, aging components or poor adjustments.

During three-dimensional measurement, the explicit description of spectral information may be forgone, because the detector matrix is intrinsically only capable of capturing intensities, because the chromatic properties of components only serve internally to gain information, as the objective of this invention is not to gain spectral information, but to gain geometrical information.

It is also preferably possible to store long-term, sub-matrix by sub-matrix, as a calibration curve entitled "lateral position against object depth", the lateral position of a center of mass point or a maximum point of each measurable object point of a reference object obtained by chromatic depth resolution and chromatic lateral splitting in the system, in each sub-matrix, within a depth calibration procedure at each depth. Additionally, the lateral positions of the spectral reference points on the detector matrix are preferably stored in a long-term memory, meaning that the target positions for each individual sub-matrix are stored long-term. When measuring an unknown object, these calibration curves "lateral position against object depth" are used for each sub-matrix even when the actual position of a sub-matrix has changed somewhat as a result of chromatic calibration. Chromatic calibration using spectral attributes of the measuring light source or one or more reference light sources—that is, the internal calibration—is then performed for the purpose of recognizing if there is a trend toward internal changes when use is made of a measuring device on the basis of the present invention by monitoring the actual lateral positions of the spectral reference points and using any determined deviations for correction purposes, if necessary. This may take place prior to a measurement or a series of measurements. In case of extreme deviations of the current lateral positions of the spectral reference points from the stored target lateral positions, an error message is obtained. In this case, an external depth calibration may take place or the instrument may be re-adjusted or repaired.

The source of electromagnetic irradiation in the system may be broadband, for example, in the UV range, in the visual range, or in the IR range or also short pulsed. For example a short pulse laser with a pulse frequency, for example, in the 100 Hz range may be used and its pulses may be synchronized with a detector matrix. This offers the possibility of three-dimensional measurement of a quickly moving scenario. Furthermore, the reference light bundles are preferably formed by amplitude splitting, preferably using a beam splitter. Furthermore, reference light bundles may be preferably formed by zero order diffraction. To this end, preferably a diffractive optical element, for example, a zone lens is located in the pupil of the measuring lens.

Object light bundles are preferably generated in the first order diffraction leading to the necessary depth splitting in the object space.

Therefore, reference light bundles are imaged achromatically. They are preferably diffracted in zero order, focused and reflected at a reference surface with partial reflexion located downstream of the measuring lens. This provides the necessary inversion of the wave fronts, so that the reference point light source array may be imaged on the detector matrix in correct orientation.

On the other hand, reference light bundles may also be back-reflected by a triple reflector following beam splitting. The triple reflector serves to afford an at least approximately achromatic reflexion of the reference light. Here again, the necessary lateral inversion of the wave fronts is given. A band-stop filter for substantial suppression of the measuring light is preferably arranged upstream of the triple reflector. On the other hand, the triple reflector may preferably also be shifted to the side or may be tilted in order not to reflect measuring light, which could then undesirably enter the detector.

Alternatively, the residual measuring light, which could possibly diffuse through the reference beam path during object scanning in an undesired manner, may also be preferably kept away from the detector matrix by pre-determined fading or deflection by controllable electro-optical or electromechanical means. Numerical compensation of the reference light in the measuring signal is also possible.

Furthermore, a portion of the polychromatic measuring light may be used in known manner for the photometric pixel-wise calibration of the sub-matrices by causing a portion of the measuring light to reach the detector matrix preferably not during measurement, but only during calibration. If this portion of the measuring light is far below the full modulation of the pixels in the detector matrix, an accumulation of many single measurements by creating a multitude of images of the detector matrix may take place. Typically this is performed prior to a measurement, or in between two measurements, as part of a background check. However, an a posteriori photometric, pixel-wise calibration of the sub-matrices is possible. In case this portion of the measuring light cannot be suppressed by controllable optical means, but instead remain permanently, i.e. always reaches the detector matrix during optical measurement, this is always to be subtracted from the measuring signal obtained by means of the sub-matrix.

The system for achieving a robust chromatic confocal technique for three-dimensional measurement of the shape of an object or of the shape and position of one or more objects is made up of the following components within the system:

An at least approximately rastered, preferably a square-rastered, planar array of polychromatic point light sources, which has at least one upstream polychromatic light source and also at least one passive rastered component, the polychromatic point light sources being adapted to generate a multitude of light bundles, a beam splitter, at least one element whose refractive power is wavelength-dependent, at least one planar detector matrix in the detection beam path which has upstream means for lateral spectral splitting and means for focusing on the detector matrix arranged such that there is a spectral axis onto the detector matrix, also referred to as λ-axis, and a measuring lens for illuminating and imaging an object.

According to the present invention, a reference beam path including at least one, at least partially spectrally defined, pre-determined reference bundle, preferably, however, including two or more reference bundles, for calibration of the system is provided, at least intermittently, in the system and the planar array of polychromatic point light sources is arranged in a position rotated, according to the present invention, through an acute angle relative to the spectral axis on the planar detector matrix (21), such rotation being performed about the optical axis (OA) of the system, so that a connecting line between point light sources upon projection onto the plane of the detector matrix forms there an acute angle with the λ-axis.

The system of the present invention comprising sub-matrices for spectral splitting of object light on the detector matrix for the purpose of spectral analysis occurs in such a manner that the detector matrix is at least almost entirely covered by laterally shifted, elongated sub-matrices, which are adjacent to each other and therefore do not overlap and are preferably disposed parallel to rows of the detector matrix. In order to achieve this, according to the present invention, the preferably at least approximately square rastered, planar array of polychromatic point light sources is in a position on the detector matrix rotated through an acute angle relative to the spectral axis, such rotation being performed about the optical axis of the system so that a connecting line between point light sources upon projection onto the plane of the detector matrix forms there an acute angle with the λ-axis.

Preferably, the spectral axis of the upstream means for spectral splitting is oriented parallel to the rows of the detector matrix. Thus it is possible to form rectangular, elongated sub-matrices even when the area of the detector matrix is fully utilized. The angle of rotation a preferably ranges from 2.8 to 26.6 degrees, which latter angular value would result in very low spectral resolution and thus also in low depth resolution.

The spectral axis on the detector matrix, the λ-axis, of the upstream means for lateral spectral splitting also encloses, according to the present invention, the acute angle α with at least approximately and at least partially parallel reference lines g'_k. The reference lines g'_k are determined by spectral reference points Rλ_jk, which are generated by optical imaging preferably by two directly adjacent point light sources, for example, j_k and j+1_k+1. Using these reference points Rλ_jk, preferably rectangular sub-matrices are defined on the detector matrix, by numerically assigning a certain number of pixels surrounding the reference point or the reference points to a sub-matrix. The geometrical midpoint M of a sub-matrix may also be determined with high precision using two spectral reference points.

If a ratio V of maximum length lmax to maximum width bmax of the sub-matrices is given in the design of the system of the present invention, in which the length lmax serves to obtain a desired depth resolution and the utilization of the maximum width bmax serves to reduce or eliminate the cross-talk between the intensity distributions of the sub-matrices, it is possible to compute an integer n coming close to the desired ratio V, by iteration for a square raster of the array of point light sources, using the following equation (1)

$$V_n = \frac{l\max}{b\max} = \frac{n^2}{\cos^2\left[\arctan\left(\frac{1}{n}\right)\right]} = n^2 + 1 \qquad (1)$$

in which n is always an integer and is always greater than or equal to the thus determined integer n and the following equation (2)

$$\alpha_n = \arctan\left(\frac{1}{n}\right) \qquad (2)$$

it is possible to determine the acute angle $\alpha_n$ pertaining to n, where n is always an integer and is always greater than or equal to 1.

Technically very interesting values of n for the purposes of the present invention range from 2 to 8, the value n=4 being particularly interesting for technical applications, this giving an angle $\alpha_4$=14.04 degrees and a ratio $V_4$=17. Thus it is possible, with a value n=4, to form, for example, sub-matrices having 68×4 pixels on the detector matrix and to arrange them without overlap, giving a coverage of the detector matrix by sub-matrices, at least in the central region of a centered detector matrix, of 100%. For a detector matrix based on a chip having approximately 30 megapixels, when n=4, approximately 100,000 object points may be detected in a single camera frame when applying the present invention. This requires a comparatively high numerical aperture and a good correction condition of the focusing lens disposed directly upstream of the detector matrix.

According to the present invention, the preferably square-rastered, planar array of point light sources must be rotated through preferably one of said angles $\alpha_n$ about the optical axis relative to the spectral axis and the corresponding length-towidth ratio of the sub-matrices $V_n$ must be realized such that a complete coverage of the detector matrix by sub-matrices may be obtained without overlaps.

Furthermore, in order to minimize the overlap between adjacent sub-matrices in the lateral direction, the ratio VT of the effective diameter of the point light sources DP to the distance d of the point light sources in the array should comply with the following relationship:

$$VT_n = \frac{DP}{d} \leq \frac{1}{2n}. \qquad (3)$$

For a rectangular raster of the array of point light sources the acute angle follows in accordance with n for the associated angle $\alpha_{n\_R}$ according to the following equation $$\alpha_{n\_R} = \arctan\left(\frac{h}{n \cdot b}\right) \qquad (4)$$

in which the raster constant h=height and the raster constant b=width, n always being an integer greater than or equal to 1. Using the angle $\alpha_n$ or the angle $\alpha_{n\_R}$, the detector matrix can be at least almost completely covered by elongated sub-matrices.

Thus it is possible, in the present invention, to employ an array of point light sources which is preferably not square-rastered but this is often of less interest for technical applications.

The means for effecting lateral spectral splitting may be a diffraction grating or a dispersion prism with a real or imaginary edge. In this case, the spectral axis, the λ-axis, is always oriented orthogonally to the lines or line-like structures of the diffraction grating or more specifically orthogonally to the real or imaginary edge of the dispersion prisms Furthermore, an optical band-pass filter may be included in the system in order to limit the spectrum of the polychromatic light source such that there is no lateral cross-talk between sub-matrices, particularly in the longitudinal direction.

Furthermore, it is possible to place a pinhole array upstream of an at least approximately optically conjugated plane in the system for the robust chromatic confocal technique for three-dimensional measurement of the shape of an object or the shape and position of one or more objects of the detector matrix, which pinhole array permits the passage of light of sharply defined images of point light sources. To this end, preferably another imaging stage may be included upstream of the detector matrix, in which an intermediate image derived from the object space and having sharply defined images of the point light sources is formed.

In a pin-hole array the number of pinholes is preferably equal to the number of point light sources, the diameter of the pinholes being slightly larger than the sharply defined images of the point light sources. Preferably the pinhole array is disposed in the beam path downstream of the beam splitting means for decoupling rays into the detection beam path, so that no front reflexions may enter the detection beam path. By means of the pinhole array, not sharply focused light from the object space is at least partially masked out and signal analysis is improved. Alternatively, use can be made of a slit diaphragm array instead of a pinhole array, such that light from sharply defined images of the point light sources may pass through the slits. The slit diaphragm array affords simpler adjustment of beam path than is the case with the pinhole array.

Furthermore, the square-rastered, planar array is configured with electronically adjustable raster constants, for example as a pinhole array on the basis of LC displays, an LCOS display or a digital micro-mirror array.

Thus the present invention may be summarized as follows:

A method and system for the chromatic confocal technique for the fast three-dimensional measurement of, in particular, the shape of an object, particularly with reference to a tooth or teeth in the jaw of a human being, comprising a planar array having at least one passive, rastered component, polychromatic point light sources, a planar detector matrix, with means for lateral spectral splitting being disposed upstream thereof and a measuring lens for illuminating and imaging the object. According to the present invention, there is generated, at least intermittently, for chromatic calibration, an at least partially spectrally defined reference light bundle using at least one passive rastered component of the arrays of light sources. Preferably, however, a plurality of reference bundles is generated. Said one or more reference light bundles are coupled through a reference beam path into the detection beam path for the purpose of spectral lateral splitting and subsequently focused onto the detector matrix as reference point images. Thus, positions, or coordinates, of spectral reference points are computed on the detector matrix and using these positions, preferably rectangular sub-matrices for spectral analysis of the object light on the detector matrix are defined with pixel accuracy, which then serve to generate measuring points, and according to the present invention, reference point lines on which there are reference points of directly adjacent sub-matrices or computed points, for example, midpoints, always only considering sub-matrices that are adjacent at their longitudinal sides, form an acute angle with the spectral axis of the upstream means for spectral splitting. The local angular orientation of the spectral axis on the detector matrix is preferably determined from at least two spectral reference points per sub-matrix, so that the detector matrix may be covered at least approximately entirely by elongated, preferably rectangular sub-matrices. These rectangular sub-matrices are preferably oriented parallel to the rows and columns of the detector matrix.

The invention will be better understood by reference to the accompany drawings

DETAILED DESCRIPTION OF THE PREFERRED EMBODIMENTS

Figure 1:
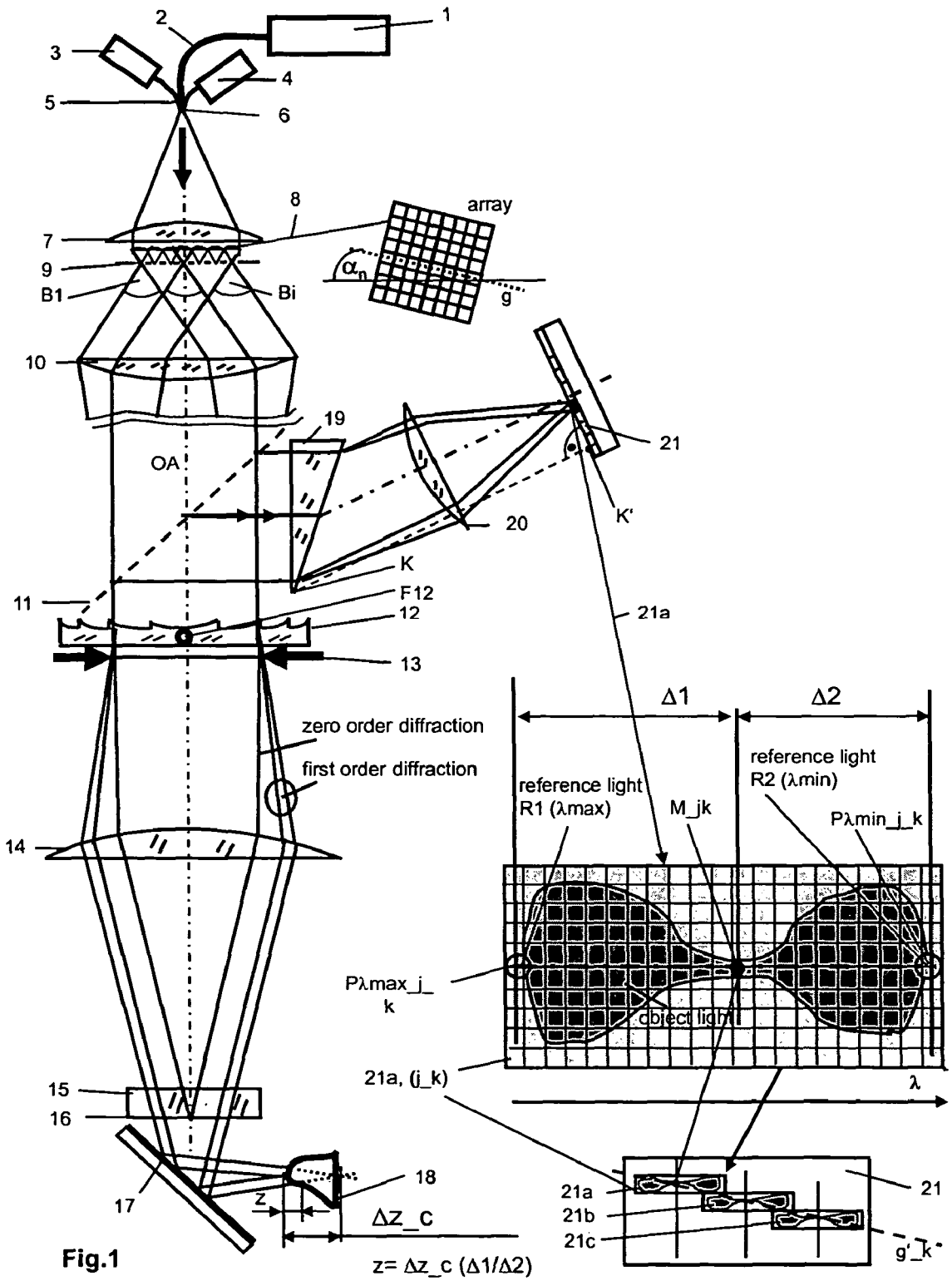
FIG. 1 shows an apparatus according to a first embodiment of the present invention.

FIG. 1 represents the use of an intraoral camera for optical, three-dimensional measurement of the shape of a tooth. The polychromatic light source used for object measurement is a fiber-coupled superluminescent diode 1 having a half-width value in the order of magnitude of approximately 100 nm. The light emitted therefrom is coupled into a fiber 2.

Furthermore, a first switchable laser diode 3 and a second switchable laser diode 4 are provided, whose light is used as reference light for calibrating the system and is coupled into the fiber 2 via a Y-junction 5, or Y-junction 6, respectively. The measuring light and reference light emerging from the end of the fiber 2 passes to a collimator lens 7 for the purpose of bundle collimation. This forms at least one approximately plane wave, which passes to a microlens array 8 comprising approximately 100×150 microlenses, which form foci which impinge on an adapted and oriented pinhole array 9. The microlens array 8 and the pinhole array 9 together form a point light source array having a square raster. From the individual pinholes, which represent the point light sources, at least approximately spherical waves, i.e., diverging beams of light B1 to Bi are propagated, from which at least approximately planar waves, i.e., collimated beams of light, are formed by means of a second collimator lens 10 and which pass through the beam splitter 11 to impinge on a phase-zone lens 12 having a negative refracting power. The measuring light is transmitted thereto predominantly in the first order of diffraction. On the other hand, the reference light, whose wavelength at the first laser diode 3 is slightly above, and at the second laser diode 4 is slightly below, the spectral distribution of the measuring light, can pass through the phase-zone lens 12 also in the zero order of diffraction. This phase-zone lens 12 is situated in the pupil plane of the measuring lens 14, which in this case represents the imaging system for the object 18. The focal length of the measuring lens 14 is in the order of magnitude of from 100 mm to 200 mm. The pupil is defined by the aperture 13. The measuring light and reference light are focused by means of the measuring lens 14 via the mirror 17 into the object's physical space. The numerical aperture (NA) of the measuring lens 14 is in this case NA=0.15. Thus it is also possible to scan details of the tooth 18 exhibiting large gradients. Due to the wavelength-dependent refracting power of the zone lens 12, chromatic longitudinal splitting of the measuring light bundle occurs in the object space in the region $\Delta z\_c$, the foci of the long-wave light being furthest from the measuring lens 14. The focal length of the phase-zone lens 12 for the average wavelength of the superluminescent diode 1 is in the order of magnitude of from 300 mm to 500 mm. Thus, depth scanning of a tooth 18 can operate in the order of magnitude of approximately 10 mm. The light reflected at a point P on the tooth 18 passes into the measuring lens 14. Here the measuring light is transmitted through the zone lens 12, again in the first order of diffraction. At the plate 15, the reference light is reflected at the surface 16, where there is a sharp image of the point light sources, and passes again through the measuring lens 14 and aperture 13, back to the zone lens 12 in the zero order of diffraction, or alternatively in the first order of diffraction. The light transmitted in the zero order of diffraction serves to subsequently form the reference images on the detector matrix 21. Reference light and measuring light are at least partially deflected at the beam splitter 11 and pass through a dispersion prism wedge 19 and a focusing lens 20 to the detector matrix 21. On this detector matrix 21 there is formed the spectrum of the intensity via the wavelength containing the information on the depth position of each object pin-point measured.

The images formed by the reference light of the point light sources created by the pinhole array 9 make it possible to define sub-matrices on the detector matrix 21 numerically, in which sub-matrices the evaluation of each spectrum of measuring light obtained upon measuring a tooth 18 is then carried out. In each case, the spectral region showing the maximum intensity or the mass center of intensity distribution is determined, in which case sub-pixel techniques may also be employed. Illustrated here are, for example, the sub-matrix j_k, or sub-matrix 21a and the assembly of sub-matrices 21b and 21c. Thus, by rotating both the microlens array 8 and the pinhole array 9 about the optical axis AO relatively to the detector matrix 21 through an acute angle an according to equation (1) it is possible to form rectangular sub-matrices that almost entirely cover the surface of the detector matrix 21. By finding the point images produced, by means of reference light of known wavelength, i.e., foci, from which the spectral reference points P$\lambda$max and P$\lambda$min can be computed here with sub-pixel accuracy in each sub-matrix, not only their position on the detector matrix 21 is determined with pixel accuracy but also the change in the wavelength is ascertained, that is to say, the spectral sensitivity of the sub-matrix, i.e., the spectral sensitivity laterally over the pixels of the detector matrix 21, is ascertained with ultrahigh accuracy. The spacing of the spectral reference points may vary somewhat on account of distortion of the focusing lens 20 particularly in the marginal region of the measuring area.

When scanning a tooth 18, evaluation of the intensity distribution of the light reflected from the tooth 18 in each sub-matrix 21a, 21b, 21c..., or in a sub-matrix j_k, the depth position of each object pin-point a, b, c ... , or an object pin-point Pj_k can be determined by computation of the chromatic confocal signal in known manner so that the shape of the tooth 18 can be determined three-dimensionally in a measurement time corresponding to the time frame for creating a single image per camera frame on the detector matrix 21, which can considerably reduce the measurement errors caused by camera-shake. The period of time required for signal evaluation may be substantially longer than that required for creating the image.

When measuring the object by means of the superluminescent diode 1, the switchable laser diodes 3 and 4 are switched off.

It is most advantageous to carry out chromatic calibration by means of the reference light, i.e. by means of the laser diodes 3 and 4, provided no tooth 18 or any other object is in the region of the measuring set-up, as then no undesirable light from these laser diodes 3 and 4 will impinge via the tooth 18 or other object onto the detector matrix 21.

Figure 2:
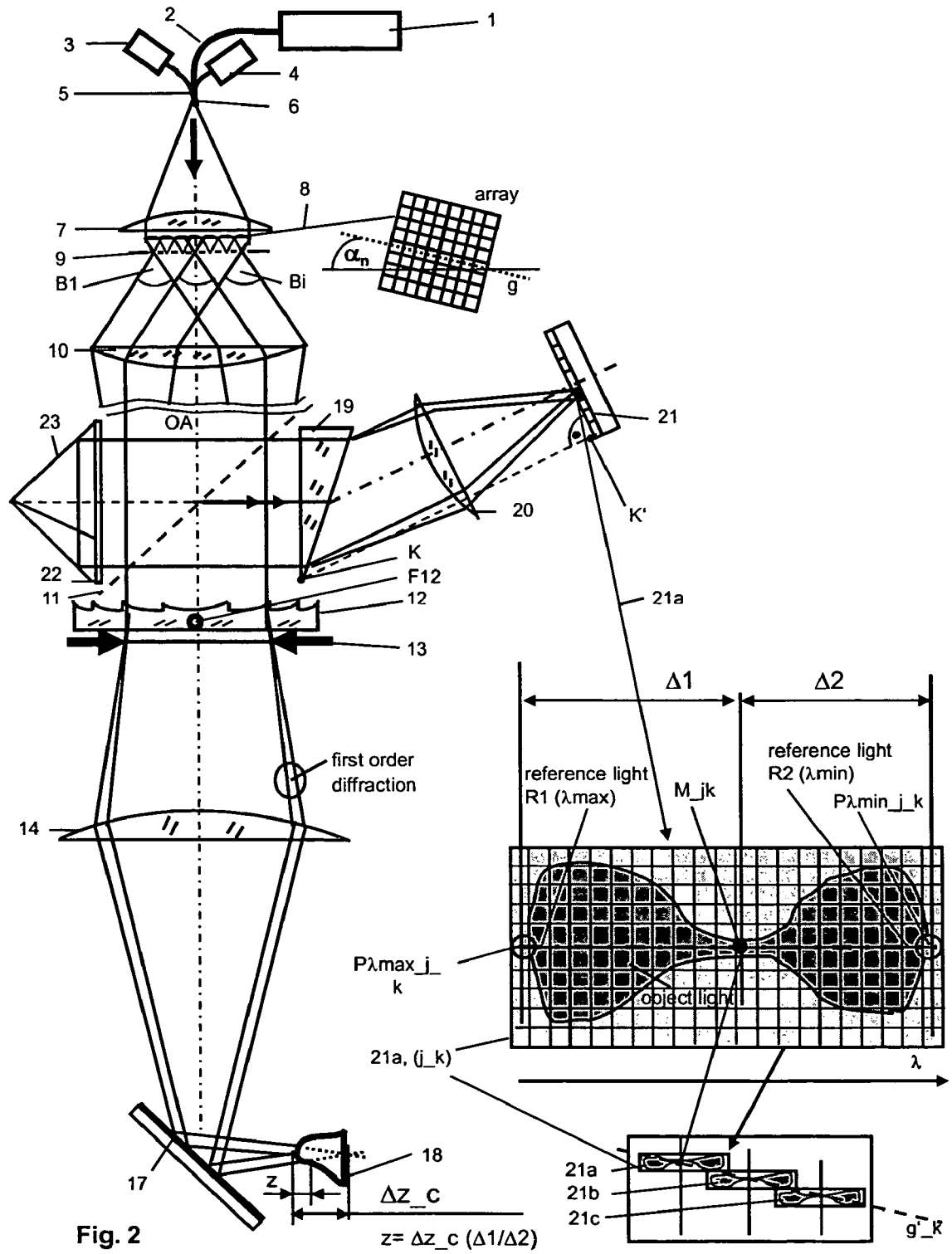
FIG. 2 shows a second embodiment.

According to another exemplary embodiment illustrated in FIG. 2, a triple reflector 23 with a band-stop filter 22 is directly assigned to the beam splitter 11, which band-stop filter substantially blocks the passage of measuring light in the reference beam path. The light of laser diode 3 and laser diode 4 reflected at the beam splitter 11 on the other hand passes through the band-stop filter 22, at least partially, is reflected by the triple reflector 23, passes through band-stop filter 22 a second time and passes through the beam splitter 11 in transmittance and then through the dispersion prism wedge 19 and is focused by means of the focusing lens 20 onto the detector matrix 21 so that sharply defined images are produced on said matrix by means of reference light from the laser diodes 3 and 4 as point light sources, for the purpose of chromatic calibration. Two images of the point light sources, i.e. foci, from which the spectral reference points P$\lambda$max and P$\lambda$min are calculated in this case, each numerically mark a sub-matrix 21a (j_k), 21b, 21c... on the detector matrix 21. In this way, the orientation of the spectral axis can be determined with ultrahigh accuracy. By means of sub-matrices 21a, 21b, 21c ... the laser diode 3 and laser diode 4 are switched off and the measuring light, i.e. the superluminescent diode 1, is switched on and the measuring procedure for tooth 18 is started.

Figure 3:
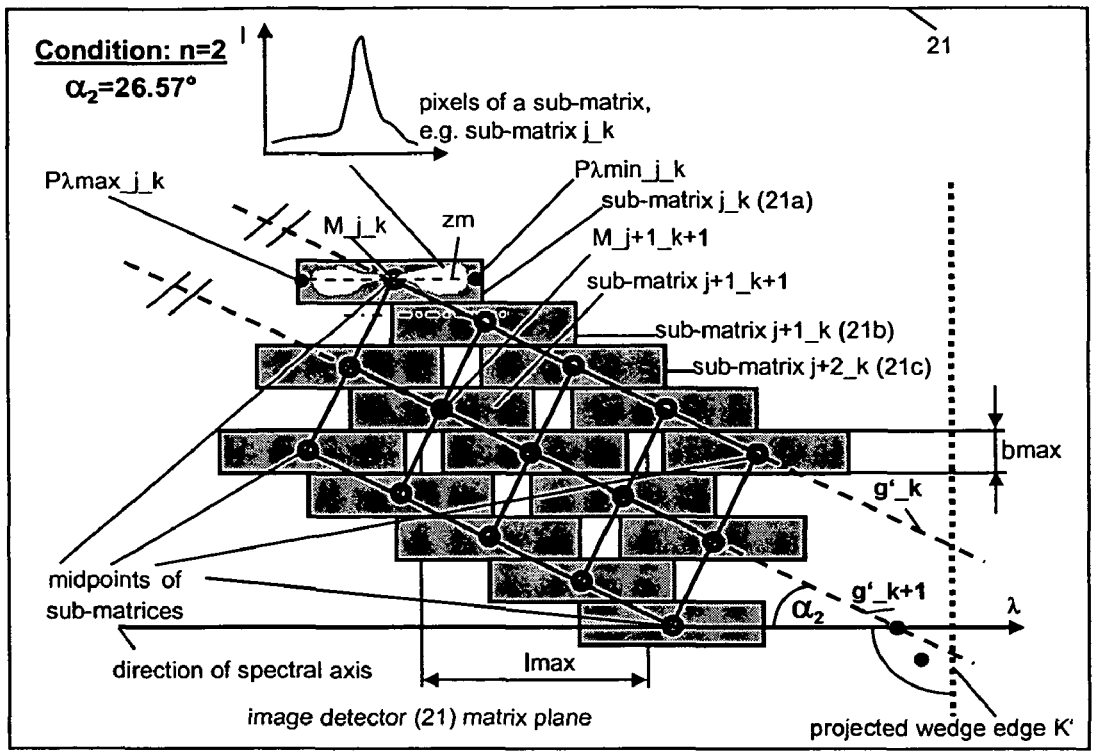
FIGS. 3 and 4 show alternative images formed by the apparatus of FIG. 2.

FIG. 3 is a partial view of the system for the condition n=2, cf. equations (1) and (2) and the relationship (3), and shows the formation of sub-matrices as spectral cells having the geometrical midpoints M on a high-pixel detector matrix 21. The angle $\alpha_2$ is in this case $\alpha_2$=26.57 degrees and the length-to-width ratio of the sub-matrices $V_2$=5, if it is desired to obtain a coverage by sub-matrices to an extent of 100%. The spectral axis, the λ axis, lies in the projection plane of the drawings and is in each case oriented in the horizontal direction. This means that in this case the elongated spectral cells, that is to say, the sub-matrices 21a, 21b, 21c . . . are oriented in the projection plane orthogonally to the real or imaginary, parallelly projected wedge edge K' of the dispersion prism wedge 19 or to the lines of a diffraction grating, for the purpose of spectral analysis. The parallel straight lines g'_k, g'_k+1'_k, g'_k+2, which join the spectral midpoints M_j_k, M_j_k+1, M_j_k+2 . . . of directly adjacent sub-matrices, and the midpoints M_j_k, M_j_k+1, M_j_k+2 of the sub-matrices are each computed from the pertaining spectral reference points Pλmax_j_k, Pλmax_j_k+1, Pλmax_j_k+2 and Pλmin_j_k, Pλmin_j_k+1, Pλmin_j_k+2 . . . each enclose an angle $\alpha2=26.57$ degrees with the longitudinal axes of the inter-parallel sub-matrices. In addition, in FIG. 3, the possible intensity distribution is illustrated in the middle line zm of a sub-matrix j_k having an intensity maximum, the lateral position of which is required for the purpose of calculating the depth of the object pin-point, i.e. its z coordinate when the geometrical/optical data of the system are known, while the lateral coordinates of this object pin-point can be computed from the position of the sub-matrix and the geometrical/optical data of the system.

Figure 4:
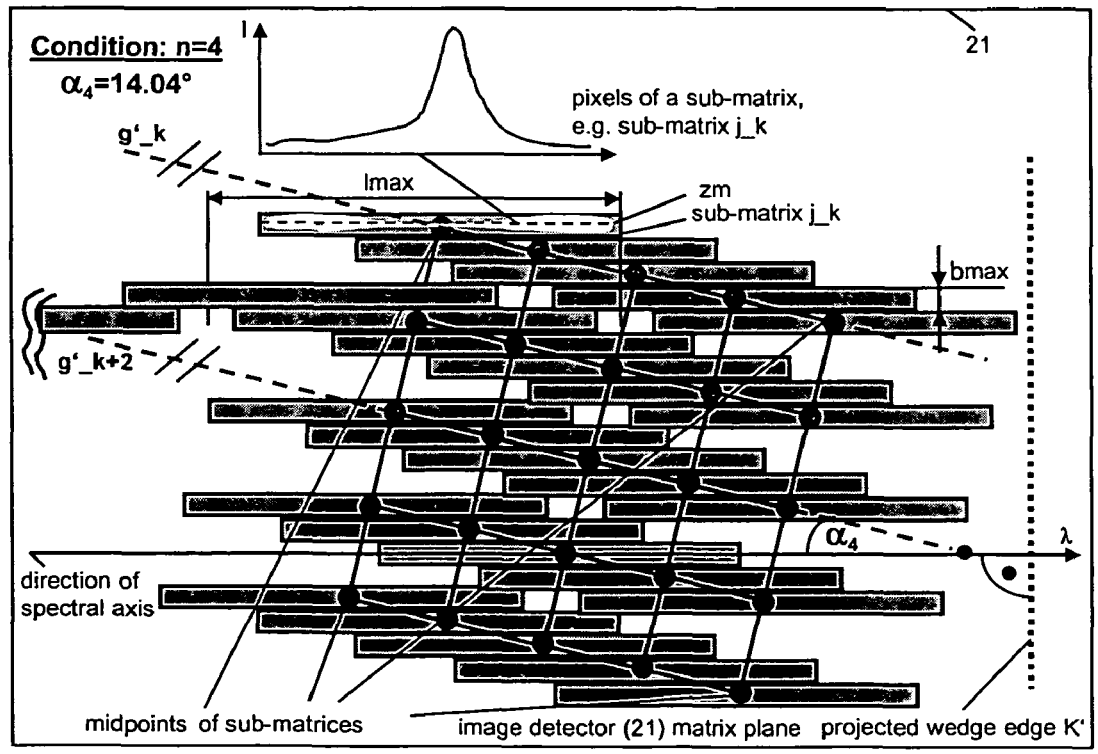

FIG. 4 is a partial view of the system for the condition n=4, cf. equations (1) and (2) and the relationship (3), and shows the formation of sub-matrices as spectral cells having the geometrical midpoints M on a high-pixel detector matrix 21. The angle $\alpha_4$ is in this case $\alpha_4=14.04$ degrees and the length-to-width ratio of the sub-matrices $V_4=17$, if it is desired to obtain a 100% coverage by sub-matrices.

The smaller the angle $\alpha_n$, the more elongated is the sub-matrix so that typically the spectral resolution and thus also the depth resolution are higher. However, the precision of depth measurement in an object pin-point can improve at a higher spectral resolution only when the available light energy is sufficiently high to excite the detector matrix 21.

In FIGS. 1 to 4 it is assumed that in the illustrated section of the detector matrix 21, precise adjustment of the system has made the spectral axis to be orientated always exactly parallel to the line direction of the detector matrix 21.

The invention claimed is:

1. A method for achieving a robust, chromatic confocal technique for three-dimensional measurement of an object shape or shape and position of one or more objects, comprising the following components in the system: a planar array of polychromatic point light sources, the polychromatic point light sources being adapted to generate a multiplicity of light bundles, a beam splitter at least one element having a refractive power that is wavelength-dependent, at least one planar detector matrix in the path of a detection beam, upstream of which detector matrix means for lateral spectral splitting and means for focusing onto the detector matrix are disposed, and a measuring lens for illuminating and imaging the object, wherein spectrally defined reference light bundles are generated for chromatic calibration, which light bundles propagate along a beam path of the polychromatic point light sources and along a reference beam path and are again coupled into the beam leading to the detection means, and, following spectral splitting, are at least approximately focused onto the detector matrix as reference pinpoint images, which are implemented for spectral analysis of the object light and by which means laterally shifted submatrices are numerically defined on the detector matrix for spectral analysis of the object light, which sub-matrices are implemented as spectral cells for three-dimensional measurement of the shape of the object.

2. The method as defined in claim 1, wherein said planar array of polychromatic point light sources comprises at least one upstream polychromatic light source as well as at least one passive rastered component, and the reference bundles spread across the passive rastered components of said planar array and propagate along said reference beam path.

3. The method as defined in claim 1, wherein said reference point images represent spectral reference points, a spectral axis being formed when two such reference points are connected into a line.

4. The method as defined in claim 3, wherein said spectral axis allows for precise numerically-based spectral analysis of each sub-matrix by determination of the angular orientation of said spectral axis on the detector matrix.

5. The method as defined in claim 4, wherein the wavelength of a first reference light bundle is above the spectral distribution of the polychromatic point light sources, and the wavelength of a second reference light bundle is below said spectral distribution.

6. The method as defined in claim 5, wherein said planar array of polychromatic point light sources is arranged in a position rotated about an optical axis through an acute angle relative to said spectral axis on the planar detector matrix.

7. A system for achieving a robust, chromatic confocal technique for the three-dimensional measurement of the shape of an object or the shape and position of one or more objects, comprising the following components in the system: a planar array of polychromatic point light sources, the polychromatic point light sources being adapted to generate a multiplicity of light bundles, a beam splitter, at least one element having a refractive power that is wavelength-dependent, at least one planar detector matrix in the path of a detection beam, upstream of which detector matrix means for lateral spectral splitting and means for focusing onto the detector matrix are disposed such that a spectral axis forms on the detector matrix, and a measuring lens for illuminating and imaging the object, wherein a reference beam path including at least one spectrally defined, predetermined reference light bundle is provided in the system for spectral calibration, and wherein said planar array is arranged in a position rotated through an acute angle relative to said spectral axis on said planar detector matrix, said rotation being effected about the optical axis of the system such that a connecting line between point light sources upon projection onto the plane of the detector matrix forms there an acute angle with the λ-axis.

8. The system as defined in claim 7, wherein said planar array of polychromatic point light sources has at least one upstream polychromatic light source as well as at least one passive rastered component).

9. The system as defined in claim 7, wherein the at least one reference light bundle can be added, at least intermittently, to the polychromatic point light sources by switching.

10. The system as defined in claim 7, wherein the light sources used for said reference light bundle are switchable laser diodes.

* * * * *

UNITED STATES PATENT AND TRADEMARK OFFICE
CERTIFICATE OF CORRECTION

| | | |
|---|---|---|
| PATENT NO. | : 7,787,132 B2 | Page 1 of 1 |
| APPLICATION NO. | : 12/223079 | |
| DATED | : August 31, 2010 | |
| INVENTOR(S) | : Klaus Körner et al. | |

It is certified that error appears in the above-identified patent and that said Letters Patent is hereby corrected as shown below:

Title Page, Item (22) should read:

-- [22] PCT Filed: Feb. 8, 2007 --.

Signed and Sealed this
Thirteenth Day of September, 2011

David J. Kappos
*Director of the United States Patent and Trademark Office*